(12) United States Patent
Scubla et al.

(10) Patent No.: US 11,867,462 B2
(45) Date of Patent: Jan. 9, 2024

(54) APPARATUS AND METHOD FOR FEEDING AND PREHEATING A METAL CHARGE IN A MELTING FURNACE

(71) Applicant: DANIELI & C. OFFICINE MECCANICHE S.P.A., Buttrio (IT)

(72) Inventors: Stefano Scubla, Udine (IT); Nicola Rondini, Udine (IT); Paolo Burin, Tricesimo (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 38 days.

(21) Appl. No.: 17/487,030

(22) Filed: Sep. 28, 2021

(65) Prior Publication Data

US 2022/0099373 A1 Mar. 31, 2022

(30) Foreign Application Priority Data

Sep. 29, 2020 (IT) .................. 102020000022990

(51) Int. Cl.
  *F27D 3/00* (2006.01)
  *C21C 5/52* (2006.01)
  *F27D 3/18* (2006.01)
  *F27D 13/00* (2006.01)
  *F27B 3/18* (2006.01)

(52) U.S. Cl.
  CPC ............ *F27D 3/0025* (2013.01); *C21C 5/527* (2013.01); *F27B 3/18* (2013.01); *F27D 13/002* (2013.01); *C21C 2005/5288* (2013.01); *F27D 2003/0034* (2013.01); *F27D 2201/00* (2013.01); *F27M 2002/11* (2013.01)

(58) Field of Classification Search
  CPC . C21C 5/527; C21C 5/565; F27B 3/18; F27B 9/12; F27D 3/0025; F27D 13/002; F27D 2003/0034; F27D 2019/0031; F27D 17/004; F27D 19/00
  USPC ........ 266/44, 144, 177, 901, 251; 373/9, 79, 373/80; 75/10.6, 10.61, 10.62, 10.66, 75/10.63, 10.38, 10.41
  See application file for complete search history.

(56) References Cited

U.S. PATENT DOCUMENTS

| | | | | |
|---|---|---|---|---|
| 4,162,891 A | * | 7/1979 | Fellnor | F27D 1/025 432/247 |
| 4,389,234 A | * | 6/1983 | Lindner | B05B 16/60 118/314 |
| 6,155,333 A | * | 12/2000 | Vallomy | C21C 5/527 164/476 |
| 7,648,551 B2 | * | 1/2010 | Sellan | F27D 17/003 75/382 |

(Continued)

FOREIGN PATENT DOCUMENTS

CH 690105 * 4/2000 .......... F27D 13/002

*Primary Examiner* — Scott R Kastler
*Assistant Examiner* — Michael Aboagye
(74) *Attorney, Agent, or Firm* — CANTOR COLBURN LLP (57) ABSTRACT

An apparatus for feeding and preheating a metal charge toward a melting furnace of a melting plant, comprising at least one conveyor channel for said metal charge, at least one hood disposed above said conveyor channel and scrap detection means able to identify the profile of the metal charge entering said conveyor channel. The present invention also concerns a plant for melting metal comprising said apparatus, and a method to feed and preheat a metal charge.

14 Claims, 5 Drawing Sheets

(56) References Cited

U.S. PATENT DOCUMENTS 9,903,654 B2 * 2/2018 Narholz ............... F27D 13/002
2001/0055739 A1 * 12/2001 Vallomy ............... F27B 9/38
432/144

* cited by examiner fig. 10 fig. 11 fig. 12 fig. 13 fig. 15 fig. 14

APPARATUS AND METHOD FOR FEEDING AND PREHEATING A METAL CHARGE IN A MELTING FURNACE

CROSS REFERENCE TO RELATED APPLICATION

This application is related to and claims the benefit of Italian Patent Application Number 102020000022990 filed on Sep. 29, 2020, the entire contents of which are incorporated herein by reference.

FIELD OF THE INVENTION

The present invention concerns an apparatus and the corresponding method, for feeding and preheating a metal charge in a melting furnace of a steel plant.

BACKGROUND OF THE INVENTION

Plants for melting metal material are known, which comprise a melting furnace, for example an electric arc furnace, provided with at least one container, or shell, inside which the metal charge is melted.

The electric arc furnace also comprises a covering roof that has apertures for the passage of the electrodes, which enter into the shell to allow the electric arc to strike, and an aperture, sometimes called "fourth hole", for extracting the fumes produced by the melting of the metal.

There are solutions that provide to feed the scrap into the furnace in a discontinuous manner, for example using baskets, or in a continuous manner, for example through a conveyor channel.

In this second case, the conveyor channel is part of a feeding and pre-heating apparatus, through which the scrap, while advancing toward the furnace thanks to the movement of the conveyor channel, is pre-heated in counter-current by the melting fumes coming out of the furnace.

In known apparatuses, at least one part of the conveyor channel is covered at the top by at least one hood, or fixed cover.

Known apparatuses have the disadvantage that only the upper layer of the metal charge, that is, the layer that is directly hit by the flow of fumes, is able to be adequately heated. The lower part remains cold or in any case less heated than the upper one. Therefore, a considerable fraction of the energy content of the fumes is not adequately exploited to heat the metal charge.

Another disadvantage of these apparatuses is that the passage area of the fumes in the tunnel, that is, the space defined between an internal surface of the hood and the upper part of the mass of scrap, depends on the shape of the scrap and its distribution on the conveyor channel. This leads to non-homogeneous preheating of the scrap.

There is therefore a need to perfect an apparatus and method for feeding and preheating a metal charge in a melting furnace that can overcome at least one of the disadvantages of the state of the art.

In particular, one purpose of the present invention is to provide such an apparatus able to preheat the metal charge in a homogeneous way regardless of the type of scrap, the quantity and its distribution on the conveyor channel.

Another purpose of the present invention is to provide a feeding and preheating apparatus that allows to optimize consumption and maximize the performance of the melting furnace located downstream.

Another purpose is to perfect a method to preheat the metal charge in a homogeneous way and to a suitable temperature, thus maximizing the performance of the melting furnace located downstream.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, an apparatus for feeding and preheating a metal charge to a melting furnace, which overcomes the limits of the state of the art and eliminates the defects present therein, comprises:

- at least one conveyor channel defining a support and advance surface for the metal charge as above,
- at least one hood disposed above the conveyor channel at a defined height with respect to the support and advance surface, defining with this channel a tunnel along which a flow of fumes is able to pass, in counter-current with respect to the direction of advance of the scrap, in order to heat the metal charge,
- scrap detection means able to identify at least the profile of the metal charge advancing along the conveyor channel.

According to one aspect of the present invention, the apparatus as above also comprises adjustment means associated with the at least one hood to move it vertically away from/toward the support and advance surface of the conveyor channel, in order to vary the hood height as a function at least of the detected profile of the metal charge.

According to another aspect, the apparatus comprises a plurality of hoods attached to each other in succession by means of respective rigid mechanical joints and movable in a coordinated manner.

According to one variant, the hoods can be attached to each other in succession by means of respective flexible mechanical joints, wherein with each hood there is associated a respective plurality of adjustment means in order to move it independently from the others.

According to another aspect, the apparatus can comprise a sealing unit associated with at least one hood, on the opposite side with respect to the furnace entrance side, and configured to prevent air from entering from the side from which the metal charge is fed toward the furnace. The sealing unit can be provided with a frame and a plurality of bands, for example vertical ones, associated with it and operationally disposed inside the tunnel.

According to one aspect, the covering frame is mobile in a manner similar to the movement provided for the at least one hood and the vertical bands move integrally with it.

According to one variant, the covering frame is fixed and the vertical bands are mobile toward/away from the support and advance surface of the conveyor channel.

According to another variant, both the support structure and also the vertical bands are mobile independently of each other.

In accordance with some embodiments, there is also provided a plant for melting metal comprising a melting furnace, continuously fed with a metal charge, a charging module, in which the metal charge is able to be deposited before being introduced into the melting furnace, and the apparatus for feeding and preheating the metal charge as above.

According to some embodiments, there is provided a method to feed and preheat a metal charge to a melting furnace of a melting plant. The method provides to:
  continuously detect at least the profile of the metal charge as it is gradually supplied,
  make the metal charge available on a conveyor channel which moves it toward the furnace, there being present, in cooperation with the conveyor channel, at least one hood at a defined height with respect to a support and advance surface of the metal charge.

According to one aspect of the present invention, the method also provides to vertically move, by means of adjustment means, the at least one hood away from/toward the support and advance surface of the conveyor channel in order to vary the hood height with respect to such surface at least as a function of the detected profile of the metal charge.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here are also for the purposes of providing non-limiting examples.

Some embodiments described here concern an apparatus 10 for feeding and preheating a metal charge S.

Figure 1:
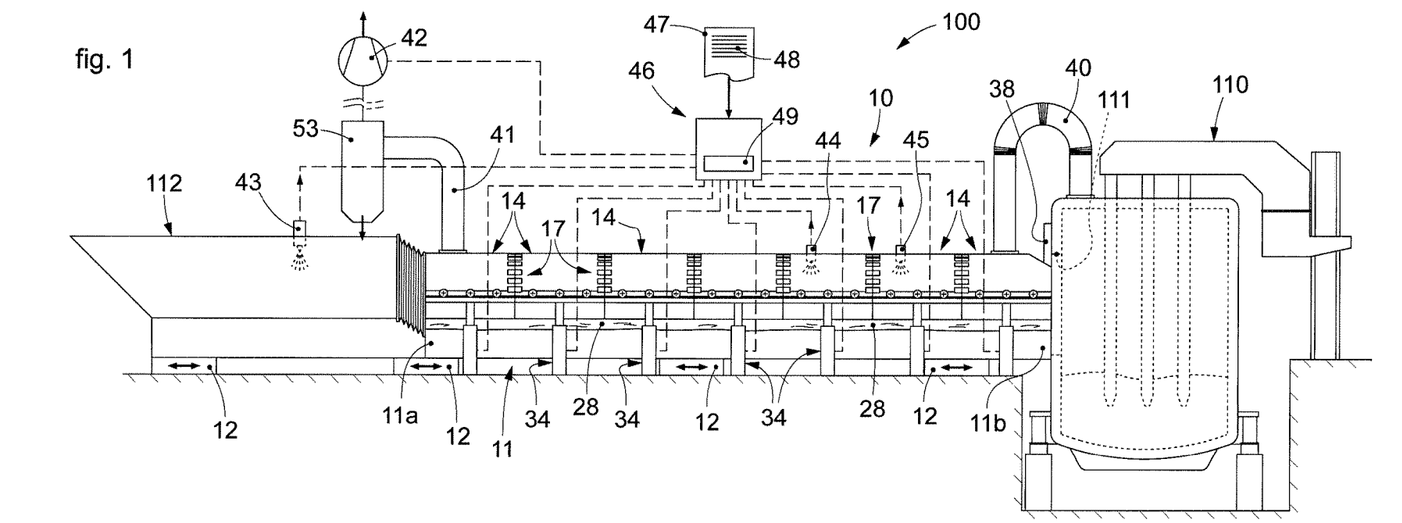
FIG. 1 is a schematic view of a melting plant in which there is inserted the apparatus for feeding and preheating a metal charge to a melting furnace in accordance with some embodiments described here.

With reference to FIG. 1, the apparatus 10 is installed in a melting plant 100, of a substantially known type, and provided with a melting furnace 110, for example an electric arc furnace fed laterally, through a charging aperture 111, with a metal charge S, such as for example ferrous scrap, hot or cold sponge iron (DRI), blocks of cold cast iron, or other.

The apparatus 10 according to the present invention allows to continuously transport and preheat the metal charge S, before it is introduced into the melting furnace 110.

The melting plant 100 can comprise a charging module 112, in which the metal charge S is able to be deposited, and downstream of which the apparatus 10 is disposed.

Typically, the apparatus 10 is therefore disposed between the charging module 112 and the melting furnace 110.

The apparatus 10 comprises at least one conveyor channel 11 along which the metal charge S is able to advance in order to be delivered to the melting furnace 110.

The conveyor channel 11 has an initial end 11a conformed to cooperate with the charging module 112 and an opposite terminal end 11b conformed to cooperate with the charging aperture 111.

The advance of the metal charge S occurs, in this case, by means of a vibrational or oscillatory movement in the longitudinal direction of the conveyor channel 11, generated by a vibration and movement device 12 of a known type, shown here by way of example in FIG. 1 with rectangles.

Figure 2:
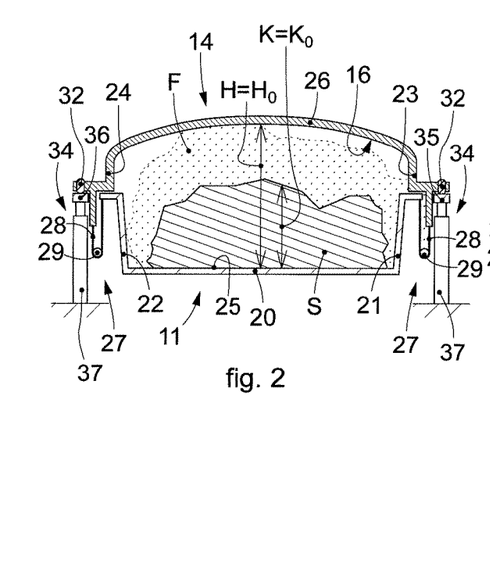
FIG. 2 is a schematic lateral section view along line VI-VI of FIG. 6, in which the hood is disposed in a lowered position.
Figure 3:
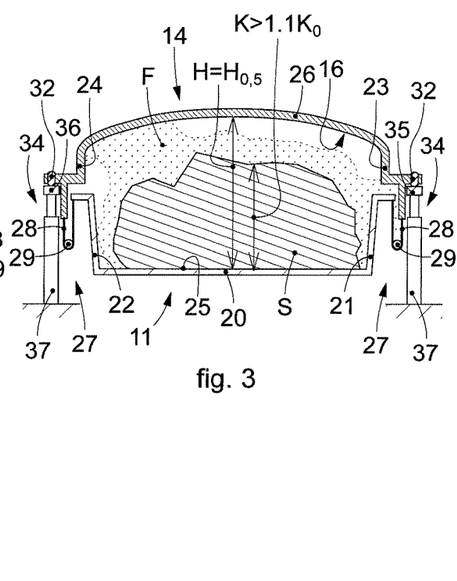
FIG. 3 is a schematic lateral section view in which the hood is disposed in an intermediate position.
Figure 4:
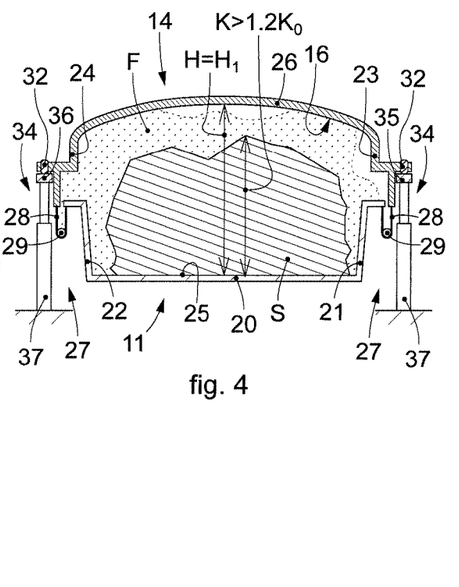
FIG. 4 is a schematic lateral section view along line V-V of FIG. 5, in which the hood is disposed in a raised position.

The apparatus 10 comprises one or more hoods 14 disposed in succession above the conveyor channel 11 so as to define with it a preheating tunnel 16, FIG. 2-4, along which at least part of the fumes F coming out of the melting furnace 110 are able to advance in order to hit the metal charge S.

According to some embodiments, the hoods 14 are disposed along the entire conveyor channel 11. Optionally, the conveyor channel 11 can cooperate with the charging module 112 to receive the metal charge S directly.

According to other possible embodiments, the hoods 14 can be disposed only along one segment of the conveyor channel 11. The conveyor channel 11 can therefore have a first segment, at exit from the charging module 112, open at the top even only temporarily for example during the charging steps, and a second segment, after the first segment, above which the hoods 14 are disposed.

According to one aspect, at least one of the hoods 14 can be vertically mobile toward/away from the conveyor channel 11 in order to vary a cross section of the tunnel 16 as a function of the conditions of the metal charge S in transit. The at least one mobile hood 14 allows, for example, to increase the volume of metal charge S that can be loaded into the melting furnace 110 and thus maximize its productivity.

Here and hereafter in the description, by conditions of the metal charge S we mean at least one characteristic selected from the profile, the distribution of the scrap on the support surface both in a vertical sense and also a horizontal sense, the sizes of the scrap, the type of material, for example but not only, chemical composition, size, shape, more or less homogeneous disposition or other.

According to some embodiments, shown in FIGS. 2-4, the at least one hood 14 is mobile between a lowered position and a raised position, through possible intermediate lifting positions. In particular, it is possible to define at least three positions:

a lowered position, in which the hood height H is equal to a minimum hood height value $H_0$, FIG. 2 an intermediate position, in which the hood height H is equal to an intermediate hood height value $H_{0.5}$, FIG. 3 a raised position, in which the hood height H is equal to a maximum hood height value $H_1$, FIG. 4.

In the event that the apparatus 10 comprises a single hood 14, it is possible to adjust the hood height H from the conveyor channel 11 so that the tunnel 16 has a linearly variable section in the longitudinal direction. For example, it is possible to move the ends of the hood 14 so as to define the desired inclination thereof.

On the other hand, in the event that the apparatus 10 comprises several hoods 14, that is, more than one hood 14, these can be disposed and attached in succession by means of respective mechanical joints 17.

Figure 5:
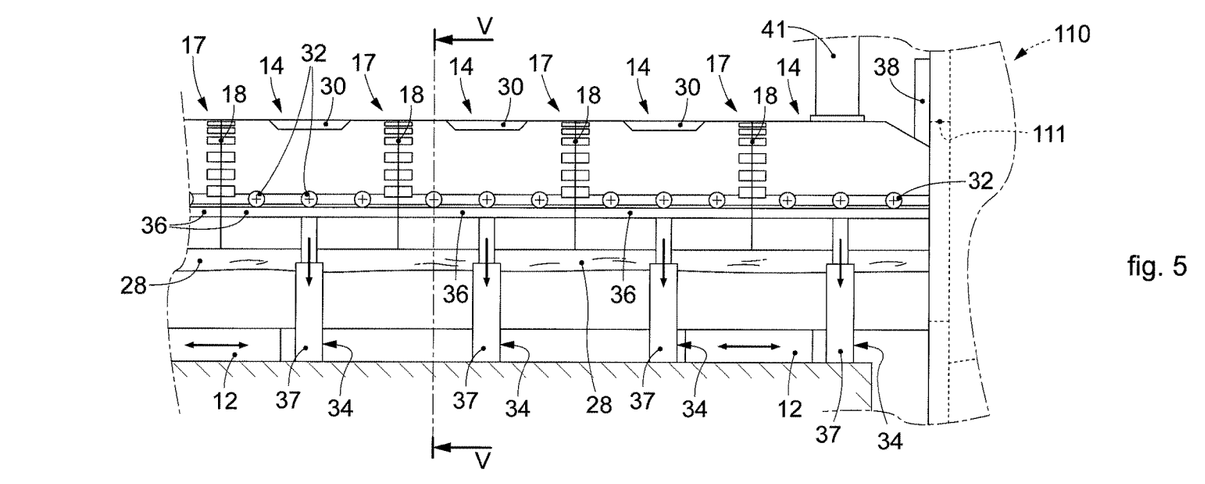
FIG. 5 is a partial and enlarged view of the apparatus of FIG. 1.
Figure 6:
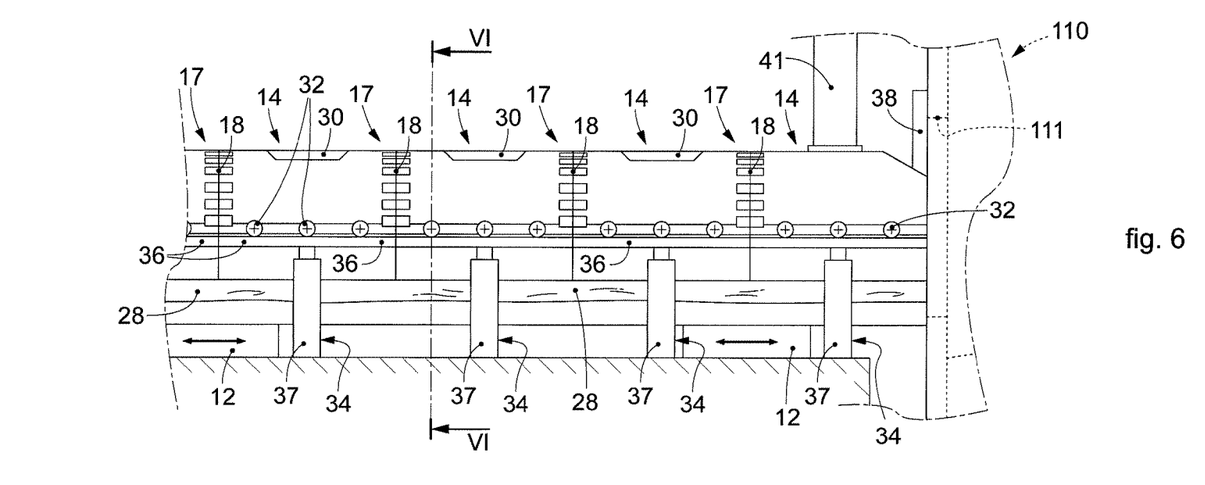
FIG. 6 is a partial and enlarged view of the apparatus described here, in which the hoods are disposed in a lowered position.

In some embodiments, shown in FIG. 1 and FIGS. 5-6, the mechanical joints 17 can be rigid mechanical joints 18. In this case, the vertical movement of the hoods 14 occurs in a coordinated and simultaneous manner in order to prevent stress and damage to the rigid mechanical joints 18. The movement configuration is substantially equivalent to that described for a single hood 14.

Figure 7:
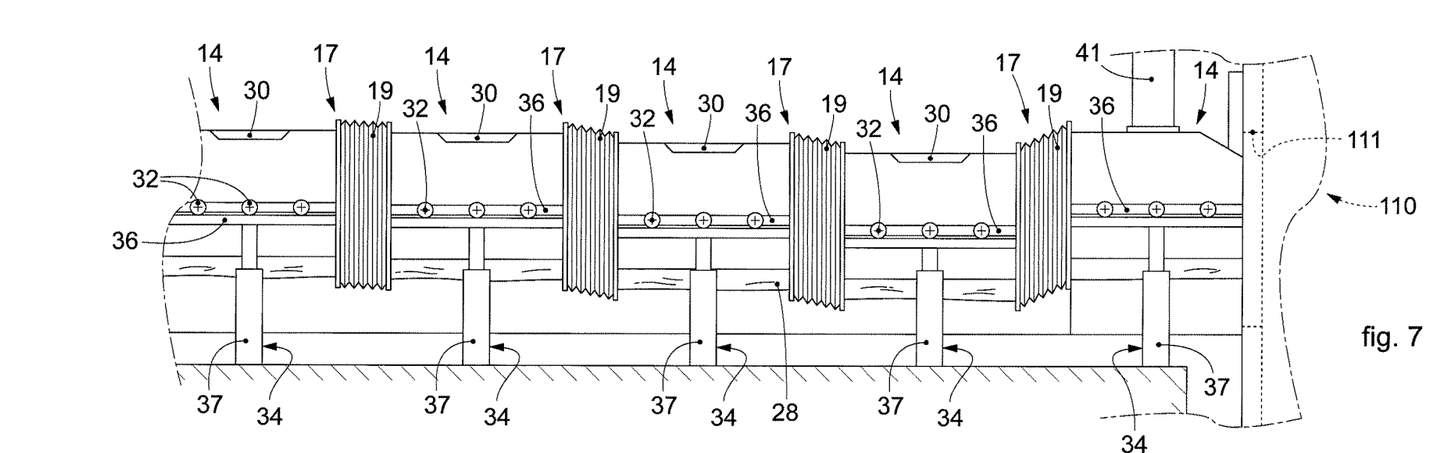
FIG. 7 shows a variant of the apparatus of FIG. 1, in which the hoods can be moved independently of each other.

In other embodiments, shown in FIG. 7, in which the apparatus 10 comprises several hoods 14, the vertical movement of each hood 14 can be commanded independently to adjust the hood height H from the conveyor channel 11 so that the tunnel 16 has a linearly variable section in segments in the longitudinal direction.

The connection between the adjacent hoods 14, and possibly with other components of the apparatus 10, can be made by means of flexible mechanical joints 19 which prevent the unwanted escape of fumes from the tunnel 16 in the event that two adjacent hoods 14 are adjusted to different hood heights H.

With particular reference to FIG. 7, the flexible mechanical joints 19 are of the bellows type, made of a reinforced textile material resistant to high temperatures.

According to some embodiments, shown in FIGS. 2-4, the conveyor channel 11 comprises a support and advance surface 25 defined by a bottom wall 20, substantially horizontal, and two lateral channel walls 21, 22 that define a cross section, in this case, substantially U-shaped.

The at least one hood 14 has opposite lateral hood walls 23, 24 and a covering wall 26 located at the top.

The hood height H can therefore be the distance between the covering wall 26 of the hood 14 and the support and advance surface 25 of the bottom wall 20 of the conveyor channel 11.

The covering wall 26 can be provided with doors with commanded opening 30 configured to allow oxygen to enter into the tunnel 16, FIGS. 5-6.

With particular reference to FIGS. 2-4, each channel lateral wall 21, 22 is associated with the corresponding hood lateral wall 23, 24 by means of adaptable sealing means 27 configured to prevent the fumes F from escaping laterally from the tunnel 16.

The adaptable sealing means 27 are configured as a flexible cover 28 that has a longitudinal extension parallel to the conveyor channel 11 and to the at least one hood 14, and made with a textile material with a metal mesh core that has high thermal resistance and resistance to transverse stresses.

The flexible cover 28 is attached along its longitudinal edges respectively to one of the channel lateral walls 21, 22 and to the corresponding hood lateral wall 23, 24 by means of mechanical attachment means of the releasable type, for example bolts, in order to facilitate maintenance when required.

A ballast 29 can be associated with the flexible cover 28 in order to keep the flexible cover 28 under tension, both during the step of ascent of the hood 14 and also during that of descent, preventing the flexible cover 28 from becoming creased, creating blocks to movement. The ballast 29 can be attached, for example, along a substantially central zone of the flexible cover 28.

Figure 9:
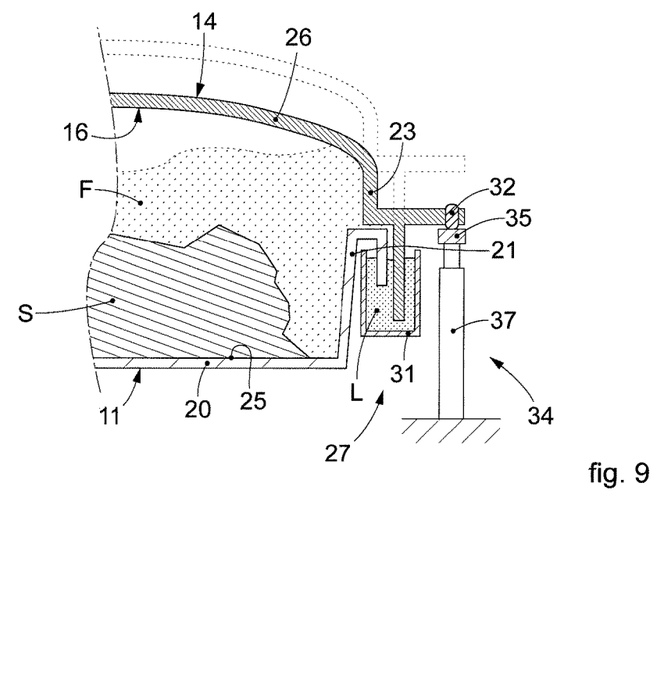
FIG. 9 shows a variant of the adaptable sealing means that can be seen in FIGS. 2-4.

In other embodiments, shown in FIG. 9, the adaptable sealing means 27 can configure a liquid-type seal of the hood 14 with the conveyor channel 11.

For example, as shown in FIG. 7, the apparatus 10 can comprise, on both sides of the conveyor channel 11, a channel 31 containing a liquid L, for example water.

The channel 31 is open at the top and has a longitudinal extension parallel to the conveyor channel 11.

The channel 31 is disposed in such a way as to accommodate both a terminal end of the channel lateral wall 21, 22 and also a terminal end of the hood lateral wall 23, 24, so that the terminal ends always remain immersed in the liquid present in the channel 31, whatever position the hood 14 is during its movement.

In other embodiments, the adaptable sealing means 27 can comprise the flexible cover 28, the channel 31 to produce the liquid-type seal, or a combination of the two.

Regardless of the type of adaptable sealing means 27 used, the ends of the channel lateral walls 21, 22 and the ends of the corresponding hood lateral walls 23, 24 can be conformed to define a labyrinth sealing device, hereafter a labyrinth 47. The presence of the labyrinth 47 allows to better protect the inside of the tunnel 16 from the outside air and to prevent the escape of fumes and dust.

Figure 14:
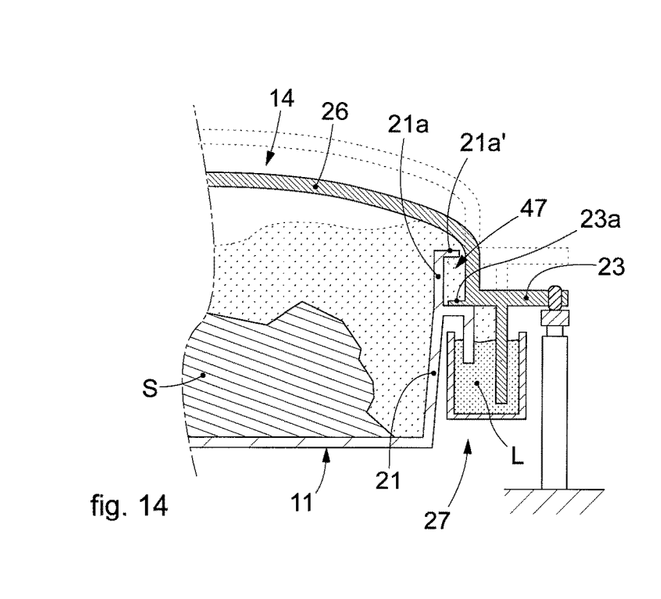
FIG. 14 is another variant of FIG. 2.

With particular reference to FIG. 14, the channel lateral wall 21 can have an extension 21a that extends the channel lateral wall 21 vertically, favorably for the entire length of the conveyor channel 11.

This extension 21a can have a longitudinal terminal segment 21a' directed toward the corresponding hood lateral wall 23.

The hood lateral wall 23 can have a longitudinal edge 23a that extends toward the extension 21a.

The longitudinal edge 23a and the longitudinal terminal segment 21a' define a non-linear path that forces the fumes and dust to complete another movement in order to reach, for example, the channel 31.

Similar considerations apply to the channel lateral wall 22 and to the hood lateral wall 24 which can both have a similar geometry.

However, solutions in which the labyrinth 47 can have another shape, structure and complexity are not excluded.

According to one aspect, the apparatus 10 can comprise adjustment means 34 associated with the at least one hood 14, on one side and on the other, in order to allow a controlled ascent and descent thereof.

The adjustment means 34 can comprise support beams 35, 36 disposed parallel to the development of the conveyor channel 11 and of the hood 14, and on which the hood 14 is resting with respect, for example, to the hood lateral walls 23, 24.

The adjustment means 34 also comprise a plurality of lifting devices 37 selected from a group comprising at least one of either a jack, a linear actuator, sliding guides, chain mechanisms, rack or worm screw mechanisms or suchlike, able to lift the support beams 35, 36.

In other possible variants, the adjustment means 34 can be associated directly with the hood 14, for example with the hood lateral walls 23, 24, without needing to provide the support beams 35, 36.

With particular reference to FIGS. 5-6 and FIG. 7, the lifting devices 37 comprise a plurality of hydraulic cylinders provided with a position transducer or a flow divider.

The hood lateral walls 21, 22 can be equipped with a plurality of rolling elements 32 able to define a sliding support of the hood 14 on the support beams 35, 36 that can possibly be conformed as rails.

In the case of several hoods 14, there are provided a pair of support beams 35, 36 for each of the hoods 14 and a respective plurality of lifting devices 37 associated laterally with each of the support beams 35, 36.

The adjustment means 34 associated with one hood 14 can be coordinated so as to lift the hood 14 uniformly on both sides.

Figure 15:
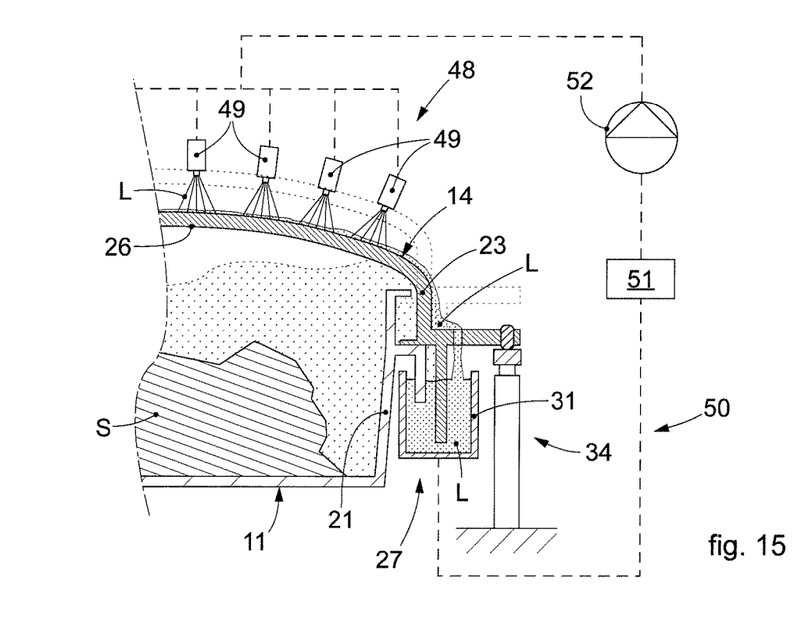
FIG. 15 schematically shows a cooling unit of the "direct" type applied to a hood.

According to some embodiments, shown in FIG. 15, with the hoods 14, or at least with some of them, there can be associated a cooling unit 48 able to prevent the excessive heat, combined with the mechanical stresses caused by the movement of the hoods 14, especially if such movement is performed in a manner that is not perfectly synchronous, from being able to cause damage to the sleeve of the hoods 14.

The cooling unit 48 can produce a cooling of the "indirect" type and comprise a plurality of panels disposed in contact with the external walls of the hoods 14 and defined by coils of pipes through which a cooling fluid passes.

Alternatively, as shown in FIG. 15, the cooling unit can produce a cooling of the "direct" type and comprise a plurality of nozzles 49, preferably low pressure ones, able to deliver a cooling fluid L, for example water, directly onto the external surface of the hoods 14.

In this case, the cooling unit 48 can comprise a cooling fluid recovery circuit 50.

The cooling fluid L delivered by the nozzles 49 hits the external surface of the hood 14 and slides by gravity from the covering wall 26 along the hood lateral walls 23, 24, cooling the flexible cover 28, if present, or pouring into the channel 31 in order to always maintain the correct filling level.

In the event that the cooling fluid L is not recovered in the channel 31, or in addition to this possibility, the cooling fluid recovery circuit 50 can comprise a collection tank (not shown) disposed below the conveyor channel 11 to collect the exhausted cooling fluid L. For example, such tank can be disposed under the floor and be covered by a grated surface.

The cooling fluid recovery circuit 50 can also comprise one or several filtering devices 51 and pumping means 52 to transfer the regenerated cooling fluid L directly to the nozzles 49 or to an accumulation tank.

According to some embodiments, the hood 14 that cooperates with the charging aperture 111 of the melting furnace 110 is provided with a panel 38 able to prevent the escape of fumes F to the outside while the melting furnace 110 is fed with the metal charge S.

The panel 38 is particularly effective when the hood 14 is in the lowered position, since the gap with the charging aperture 111 in that case is greater.

Figure 8:
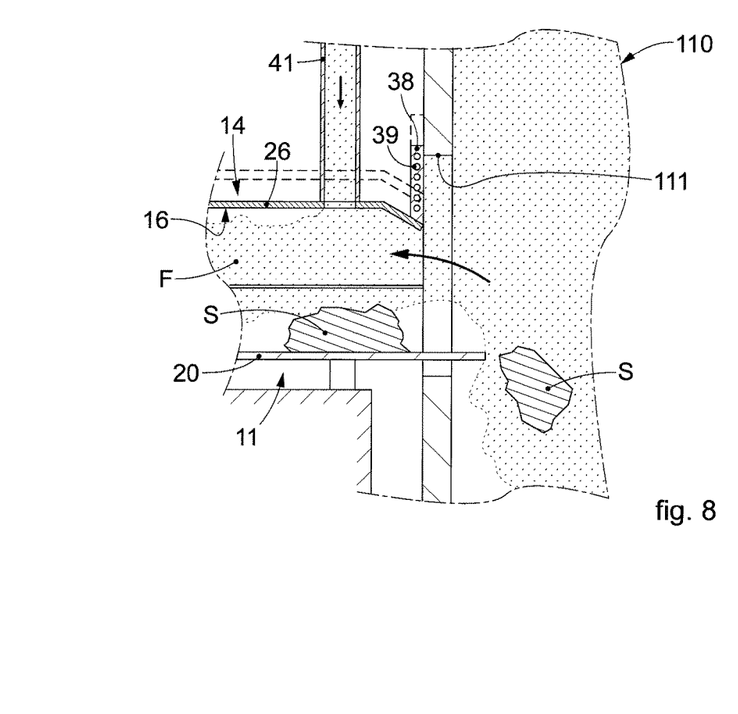
FIG. 8 shows an enlarged detail, shown in section, of FIG. 1.

The panel 38 can be advantageously liquid cooled by means of a suitable cooling circuit 39, FIG. 8.

The apparatus 10 can possibly comprise a fumes inlet duct 40, disposed so as to fluidically connect the melting furnace 110 with the tunnel 16, and a fumes outlet duct 41 configured to allow the fumes to be expelled from the tunnel 16.

The fumes inlet duct 40 is favorably connected in correspondence with a final segment of the tunnel 16, adjacent to the melting furnace 110, while the fumes outlet duct 41 can be associated with an initial segment of the tunnel 16, adjacent to the charging module 112.

The fumes inlet duct 40 can be fluidically connected to the last hood 14, that is, the one that is closest to the melting furnace 110.

The fumes outlet duct 41 can be fluidically connected to one of the first hoods 14, that is, to one of those that are closest to the charging module 112.

Figure 10:
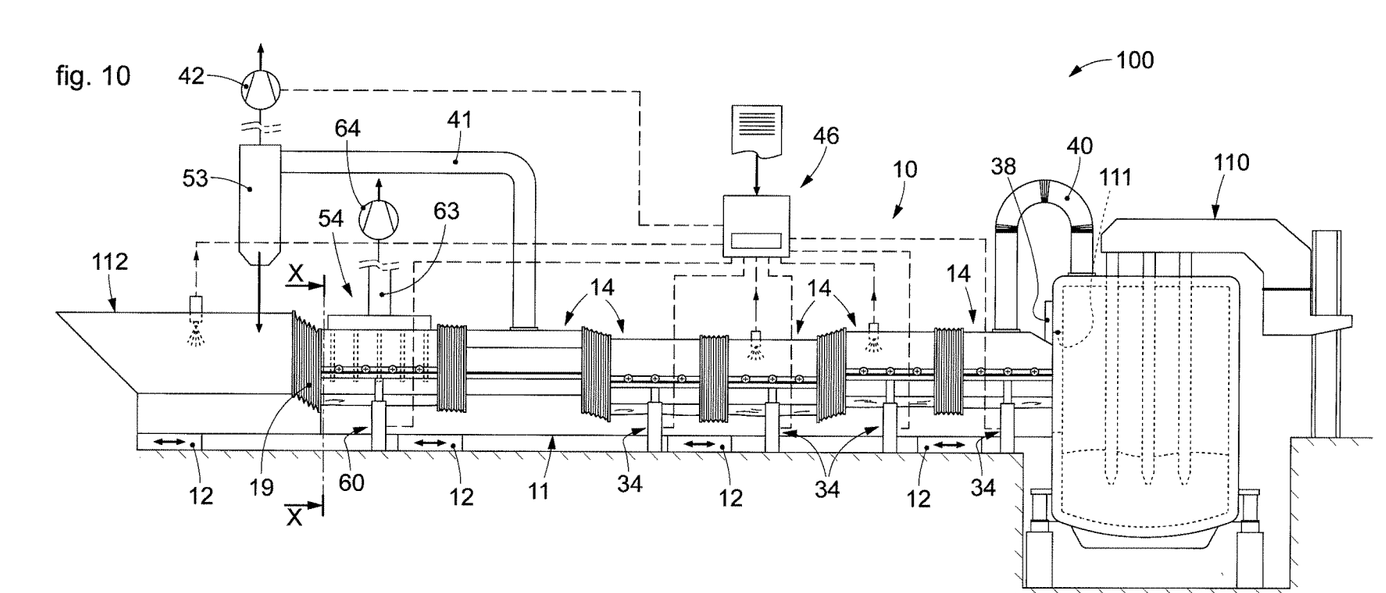
FIG. 10 is a schematic view of a melting plant in which there is inserted the apparatus for feeding and preheating a metal charge to a melting furnace in accordance with other embodiments described here.

As shown in the embodiment of FIG. 10, one of the first hoods 14 can be advantageously fixed and disposed at a height corresponding to the maximum height of the mobile hoods 14 disposed downstream, and can be associated with the next one by means of a flexible mechanical joint 19, as previously described. This configuration allows to prevent the fumes outlet duct 41 segment from having to be made mobile/flexible.

In possible implementations, the fumes inlet duct 40 can be an autonomous duct, or it can be defined by the charging aperture 111 and by the terminal part of the tunnel 16.

With the fumes outlet duct 41 and/or the fumes inlet duct 40 there are associated fumes movement means 42 configured to convey the fumes inside the tunnel 16 so that they hit the metal charge S in transit uniformly and with the desired speed and temperature, and to promote the extraction of the fumes F toward suitable filtering apparatuses located downstream.

Advantageously, the fumes are made to pass in the tunnel 16 counter-current with respect to the direction of advance of the metal charge S in the conveyor channel 11.

According to possible implementations, the fumes movement means 42 can comprise one or more fans, valves, filters, pressure regulators or suchlike.

According to one possible embodiment, the fumes movement means 42 of the fumes outlet duct 41 can advantageously comprise a cyclone device 53 by means of which the fumes F extracted from the tunnel 16 pass.

The cyclone device 53 allows to slow down the metal dusts contained in the fumes F and prevent them from entering into the filtering devices located downstream, preventing them from being damaged.

The metal dusts that precipitate in the cyclone device 53 can be reintroduced into the conveyor channel 11, directly or subsequently, together with the metal charge S, increasing its yield. For example, in FIG. 1 the unloading of the collected dust occurs directly inside the charging module 112; however, other configurations are also possible.

According to some embodiments, shown in FIG. 1, the apparatus 10 comprises scrap detection means 43 configured to detect at least the punctual profile of the metal charge S. For example, the scrap detection means 43 are configured at least to detect an average scrap height K of the metal charge S in transit.

More in particular, the scrap detection means 43 are configured to detect the profile of the metal charge S in transit, and therefore its height K in the conveyor channel 11, as a function of the position on the width of the latter. The integral of the profile of the metal charge S defined by all the heights K detected on the same section allows to obtain the area corresponding to the section occupied by the metal charge S.

The scrap detection means 43 can comprise a laser beam detection system or an X-ray or radar detection system.

In particular, the laser beam detection system allows to analyze both spatial and also spectrometric characteristics of the metal charge S in transit.

The scrap detection means 43 can be disposed in correspondence with an entrance zone of the tunnel 16 or upstream thereof, for example in a zone adjacent to the charging module 112.

In combination with the X-ray or radar detection systems, the scrap detection means 43 can provide video cameras and/or photo cameras to detect any unwanted dragging of the scrap caused by an excessive passage speed of the fumes F inside the tunnel 16.

According to some embodiments, shown in FIG. 10, upstream of the first hood 14, that is, between the charging module 112 and the first hood 14, the apparatus 10 can comprise a sealing unit 54 configured to prevent the entry of air from the scrap feed zone, in this specific case from the charging module 112.

The sealing unit 54 is configured as a cover comparable to a hood 14 and defines, together with the part of the conveyor channel 11 above which it is disposed, a first segment of the tunnel 16.

Figure 11:
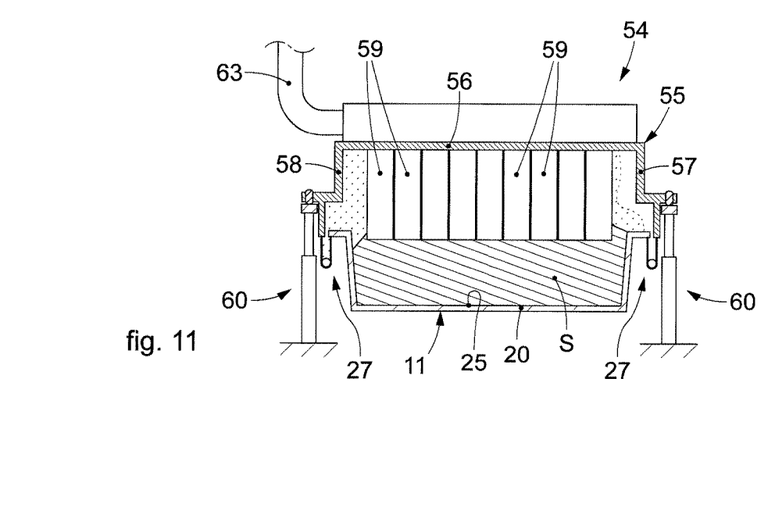
FIG. 11 is a schematic lateral section view along line X-X of FIG. 10, in which the covering frame of the sealing unit is disposed in a completely raised position.
Figure 12:
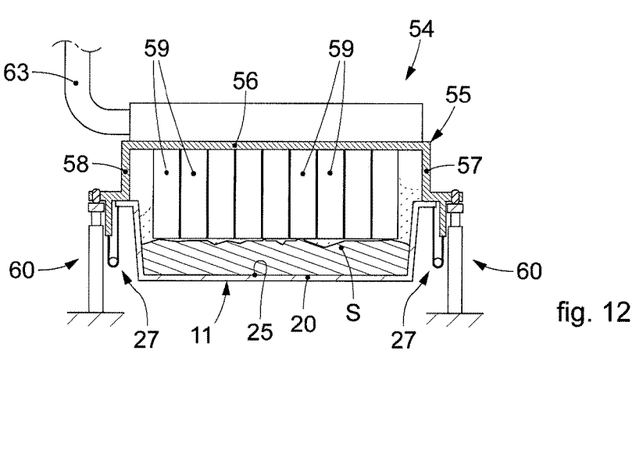
FIG. 12 is a schematic lateral section view, in which the covering frame of the sealing unit is disposed in a partly raised position.

With reference to FIGS. 11-12, the sealing unit 54 comprises a covering frame 55 defined by an upper wall, or roof, 56 and two opposite lateral flanks 57, 58 which are laterally associated with the upper wall 56.

The sealing unit 54 comprises a plurality of vertical metal bands 59 placed side by side to form one or more rows disposed at a certain distance from each other in the direction of advance of the metal charge S, which can be seen with a dashed line in FIG. 10.

The vertical bands 59 are disposed, for almost their entire length, inside the tunnel 16.

Figure 13:
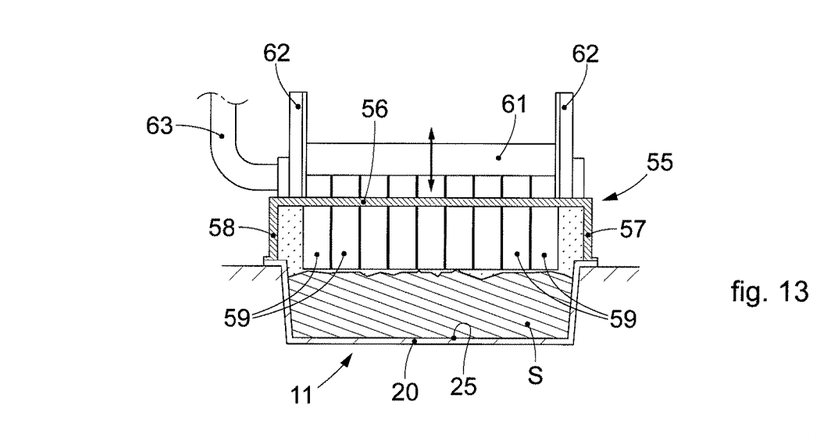
FIG. 13 is a variant of FIG. 2 comprising a labyrinth device.

The vertical bands 59 can be attached directly to the internal surface of the upper wall 56 or to a support structure 61 associated therewith, see for example FIG. 13. Optionally, the upper wall 56 can be provided with slits through which the vertical bands 59 are made through.

Similarly to the movement of the at least one hood 14, the sealing unit 54 can be vertically mobile away from/toward the conveyor channel 11 in order to vary a cross section of the tunnel 16 as a function of the conditions of the metal charge S in transit and of the required sealing needs.

For example, with a lowering of the sealing unit 54, or of the frame 55, there can correspond the need to make the metal charge S in transit uniform and better distributed, or to "seal" the charge S in transit to prevent the presence of an excessive gap from the which air can enter from the charging zone, FIG. 12. A raising of the sealing unit 54, or of the frame 55, may be required in the event that there is a desire to maximize the entry of scrap in order to increase the productivity of the melting furnace 110, FIG. 11.

The movement of the sealing unit 54 can be performed by means of suitable movement means 60, substantially similar to the adjustment means 34 described with reference to the hoods 14.

The movement means 60 can be laterally associated with the frame 55, for example with the two opposite lateral flanks 57, 58.

Furthermore, similarly to what has been described for the hoods 14, in order to ensure the lateral containment of the fumes F and of the dusts, the sealing unit 54 is provided with adaptable sealing means 27, of the flexible cover 28 or liquid type, FIGS. 11-12.

According to some embodiments, the vertical bands 59 are integral, that is, they are mobile in an integral manner, with the frame 55, FIGS. 11-12.

According to one variant, shown in FIG. 13, the frame 55 can be fixed with respect to the conveyor channel 11 while the vertical bands 59 are mobile with respect to the frame 55, for example with respect to the upper wall 56.

In this case, it is possible to calibrate both the height of the vertical bands 59, with respect to the surface of the underlying metal charge S, and also the resistance to the advance exerted on the metal charge S.

With particular reference to FIG. 13, the vertical bands 59 are associated with a support structure 61 sliding on guides 62 which are associated with the upper wall 56 outside the tunnel 16.

According to another variant, it is possible to provide the movement of both the frame 55 and also the vertical bands 59 independently of each other.

With the sealing unit there can be associated an auxiliary suction duct 63, with which fumes extraction means 64 are associated in order to evacuate the fumes F not captured by the fumes outlet duct 41, disposed downstream, and the air filtering between the vertical bands 59, entering from upstream.

The apparatus 10 also comprises one or more temperature detection devices 44 and one or more carbon monoxide detection devices 45 disposed inside the tunnel 16, preferably at least in a terminal zone thereof.

The apparatus 10 comprises a processing and control unit 46 configured to receive at least:
  a first operating signal from the scrap detection means 43 containing the information relating to the conditions of the metal charge S, for example the profile,
  a second operating signal from the adjustment means 34, for example from the position transducers associated therewith, containing the information relating to the hood height/s,
  a third operating signal from the fumes movement means 42, for example from the fan, containing information relating to the current suction flow rate, and to send at least:
  an operating signal of command to the adjustment means 34 to adapt the hood height to the operating conditions that are either required or to be obtained.

Furthermore, the processing and control unit 46 is able to control the movement of the sealing unit 54 by adjusting the ascent/descent of the movement means 60, or directly only the movement of the vertical bands 59 on account of the first operating signal from the scrap detection means 43 as above.

The processing and control unit 46 can also command a change in the flow rate of the fumes movement means 42 and of the fumes extraction means 64, as well as the drive of the doors with commanded opening 30.

In addition, the processing and control unit 46 can receive respective signals from the one or more temperature detection devices 44, and from the one or more carbon monoxide detection devices 45, and process the information contained combining them with the fumes passage speed parameter.

According to some embodiments, the processing and control unit 46 is programmed with a computer program 47. The computer program 47 comprises a machine code 48 executable by the processing and control unit 46. The execution of the machine code 48 by the processing and control unit 46 causes the processing and control unit 46 to actuate an artificial intelligence 49.

The artificial intelligence 49 can be a neural network. The neural network can be a Deep Neural Network (DNN) or a Convolutional Neural Network (CNN). It is also possible that the artificial intelligence 49 comprises several neural networks of different types.

Furthermore, or as an alternative, the artificial intelligence 49 can comprise, individually or in combination, a Support Vector Machine (SVM), a decision tree, a Bayesian network, a self-organizing map, case-based reasoning, instance-based learning, or other.

According to one embodiment, the hood height H of the at least one hood 14 from the conveyor channel 11 can vary depending on the profile of the metal charge S detected continuously or at determinate time intervals.

According to another embodiment, the hood height H of the at least one hood 14 from the conveyor channel 11 can vary depending on the average scrap height K and possibly on the type of metal charge S.

According to some embodiments, there is provided a method to feed and preheat a metal charge S to the melting furnace 110. The method provides to:
 detect continuously, or at pre-established intervals, the profile of the metal charge S as it is gradually supplied,
 make the metal charge S available on the conveyor channel 11 that moves it toward the furnace 110, there being present, in cooperation with the conveyor channel 11, the at least one hood 14 at a hood height H with respect to the support and advance surface 25 of the conveyor channel 11.

According to one aspect, the method also provides to vertically move, by means of the adjustment means 34, the at least one hood 14 away from/toward the support and advance surface 25 in order to vary the hood height H as a function at least of the detected profile of the metal charge S.

The method also provides to
 calculate the area of each section of the tunnel 16 based on the knowledge of the current hood height H,
 calculate the area corresponding to the section occupied by the metal charge S based on the detected profile of the metal charge S,
 calculate the fumes passage area as the difference between the area of the section of the tunnel 16 and the area of the metal charge S,
 calculate the average passage speed of the fumes as the ratio between the suction flow rate of the fumes movement means 42, for example of the suction fan, and the difference between the area of the section of the tunnel 16 and the area of the metal charge S,
 compare the average fumes passage speed with a desired fumes passage speed value, for example that maximizes heat exchange,
 dynamically modify the height H of the hood(s) 14 in order to obtain the desired fumes passage speed value.

In particular, the current height H of the hoods 14 can be obtained from the measurement detected by the position transducers associated with the lifting devices 37 of the adjustment means 34.

Since the greater the speed of the fumes, the greater the turbulences that hit the metal charge S, in order to achieve a high heat exchange it is advisable to keep the passage speed of the fumes high.

However, an excessively high speed of the fumes entails the risk of dragging pieces of surface scrap which would cause damage if they were sucked in for example through the fumes outlet duct 41; an excessively low speed of the fumes would prevent an optimal and homogeneous heating of the metal charge S, reducing the yield of the melting furnace 110.

The dynamic movement of the hood(s) 14 allows to "follow" the optimum/desired fumes passage speed, thereby being able to maximize the yield of the melting furnace 110 in any condition whatsoever.

According to another possible operating mode that takes into account the average scrap height K:
 if the average scrap height K of the metal charge S is approximately equal to a reference average scrap height $K_0$, the at least one hood 14 is moved into a lowered position, in which the hood height H is equal to the minimum hood height value $H_0$, FIG. 2. Furthermore, the commanded opening doors 30 are closed. In this case, the operational objective is to minimize energy consumption, measured for example in KWh per ton of metal charge S in transit;
 if the average scrap height K of the metal charge S is greater than the reference average scrap height $K_0$, for example by about 10%, the at least one hood 14 is moved into an intermediate position in which the hood height H is equal to the intermediate hood height value $H_{0.5}$, FIG. 3. Furthermore, the commanded opening doors 30 are at least partly open. In this case, the operational objective is a trade-off between minimizing energy consumption and maximizing the flow rate of the metal charge S in transit;
 if the average scrap height K of the metal charge S is greater than the reference average scrap height $K_0$, for example by about 20%, the at least one hood 14 is moved into a raised position, in which the hood height H is equal to the maximum hood height value $H_1$, FIG. 4. Furthermore, the commanded opening doors 30 are at least partly open. In this case, the operational objective is to maximize the flow rate of metal charge S entering the melting furnace 110, measured for example in tons of metal charge S in transit in one hour.

In the event that it were necessary to increase the heat exchange with the metal charge S, it is possible to lower the at least one hood 14, thus reducing the fumes passage area, in this way increasing the passage speed of the fumes in the tunnel 16.

It is clear that modifications and/or additions of parts or steps may be made to the apparatus and method for feeding and preheating a metal charge to a melting furnace as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. A method to feed and preheat a metal charge to a melting furnace of a melting plant, said method comprising:
 providing an apparatus comprising: at least one conveyor channel for said metal charge defining a support and advance surface; at least one hood disposed above said at least one conveyor channel at a hood height, defining with it a tunnel along which a flow of fumes is able to pass in order to heat said metal charge; scrap detection means able to identify a profile of the metal charge entering said conveyor channel; and adjustment means associated with said at least one hood in order to move the at least one hood vertically away from/toward said support and advance surface of the at least one conveyor channel in order to vary said hood height as a function of the profile of said metal charge; and a plurality of hoods disposed and attached in succession by respective rigid mechanical joints and vertically movable in a coordinated manner;

detecting continuously, or at pre-established intervals, the profile of the metal charge as it is gradually supplied, making said metal charge available on said at least one conveyor channel which moves said metal charge toward the furnace, providing, in cooperation with said at least one conveyor channel, said at least one hood at said hood height with respect to the support and advance surface of said conveyor channel, and providing to vertically move, by means of the adjustment means, said at least one hood away from/toward said support and advance surface in order to vary said hood height at least as a function of the profile of said metal charge.

2. The method as in claim 1, further comprising:

calculating an area of a section of the tunnel defined by said at least one conveyor channel and by said at least one hood disposed above, based on knowledge of the current hood height, calculating an area of the metal charge corresponding to the area of the section occupied by the metal charge in transit on the basis of the profile detected, calculating a fumes passage area as the difference between said area of the section of the tunnel and said area of the metal charge, calculating an average passage speed of the fumes as a ratio between a current flow rate of fumes movement means and said difference between said area of the section of the tunnel and said area of the metal charge, comparing the average fumes passage speed with a desired fumes passage speed value, and dynamically modifying said height of said at least one hood in order to obtain said desired fumes passage speed value.

3. The method as in claim 2, further comprising varying said hood height at least as a function of an average scrap height of the metal charge in transit.

4. A method to feed and preheat a metal charge to a melting furnace of a melting plant, said method comprising:

Providing an apparatus comprising: at least one conveyor channel for said metal charge defining a support and advance surface; at least one hood disposed above said at least one conveyor channel at a hood height, defining with it a tunnel along which a flow of fumes is able to pass in order to heat said metal charge; scrap detection means able to identify a profile of said metal charge entering said at least one conveyor channel; and adjustment means associated with said at least one hood in order to move the at least one hood vertically away from/toward said support and advance surface of the at least one conveyor channel in order to vary said hood height as a function of the profile of said metal charge; a plurality of hoods disposed and attached in succession by means of respective flexible mechanical joints, with each of said hoods there being associated with a respective plurality of adjustment means configured to move the respective hood independently from the others;

detecting continuously, or at pre-established intervals, the profile of the metal charge as it is gradually supplied, making said metal charge available on said at least one conveyor channel which moves said metal charge toward the furnace, providing, in cooperation with said at least one conveyor channel, said at least one hood at said hood height with respect to said support and advance surface of said at least one conveyor channel, and providing to vertically move, by means of the adjustment means, said at least one hood away from/toward said support and advance surface in order to vary said hood height at least as a function of the profile of said metal charge.

5. An apparatus for feeding and preheating a metal charge toward a melting furnace of a melting plant, comprising:

at least one conveyor channel for said metal charge defining a support and advance surface;

at least one hood disposed above said at least one conveyor channel at a hood height, defining with it a tunnel along which a flow of fumes is able to pass in order to heat said metal charge;

scrap detection means able to identify a profile of the metal charge entering said conveyor channel;

adjustment means associated with said at least one hood in order to move the at least one hood vertically away from/toward said support and advance surface of the at least one conveyor channel in order to vary said hood height as a function of the profile of said metal charge; and a plurality of hoods disposed and attached in succession by respective rigid mechanical joints and vertically movable in a coordinated manner.

6. The apparatus as in claim 5, wherein the at least one hood is mobile at least between a lowered position, in which the hood height is equal to a minimum hood height value, an intermediate position, in which the hood height is equal to an intermediate hood height value, and a raised position, in which the hood height is equal to a maximum hood height value.

7. The apparatus as in claim 5, also comprising a sealing unit associated with said at least one hood, on an opposite side with respect to a furnace entrance side, cooperating with said at least one conveyor channel in order to define an initial segment of said tunnel, said sealing unit being provided with:

a frame having an upper wall and two opposite lateral flanks, and a plurality of bands associated in a suspended manner with said upper wall and adjacent in order to form one or more rows disposed at a certain distance from each other in a direction of advance of the metal charge inside said tunnel, wherein it also comprises movement means associated with said frame in order to move it vertically away from/toward said support and advance surface of said at least one conveyor channel, varying its vertical distance so that said vertical bands are able to seal said metal charge in transit.

8. The apparatus as in claim 7, wherein said bands are configured to be moved independently with respect to said frame.

9. The apparatus as in claim 5, wherein said at least one conveyor channel comprises a bottom wall and two lateral channel walls, and said at least one hood comprises respective lateral hood walls opposite each other, and a covering wall located at the top, said lateral hood walls being associated with said lateral channel walls by means of adaptable sealing means.

10. The apparatus as in claim 5, wherein said adjustment means comprise a plurality of lifting devices selected from a group comprising at least one of either a jack, a linear actuator, sliding guides, chain mechanisms, rack or worm screw mechanisms.

11. The apparatus as in claim 5, wherein at least one hood, or the last hood, is terminally provided with a panel which projects vertically from the covering wall and is provided internally with a liquid cooling circuit.

12. The apparatus as in claim 5, wherein it comprises a processing and control unit configured at least to receive a first operating signal from the scrap detection means containing at least information relating to the profile of the metal charge, and to process and send respective control operating signals at least to said adjustment means.

13. A plant for melting metal, comprising a melting furnace, continuously fed with a metal charge, a charging module, in which said metal charge is able to be deposited before being introduced into the melting furnace, and an apparatus for feeding and preheating said metal charge as in claim 5.

14. An apparatus for feeding and preheating a metal charge toward a melting furnace of a melting plant, comprising:

at least one conveyor channel for said metal charge defining a support and advance surface;

at least one hood disposed above said at least one conveyor channel at a hood height, defining with it a tunnel along which a flow of fumes is able to pass in order to heat said metal charge;

scrap detection means able to identify a profile of said metal charge entering said at least one conveyor channel adjustment means associated with said at least one hood in order to move the at least one hood vertically away from/toward said support and advance surface of said at least one conveyor channel in order to vary said hood height as a function the profile of said metal charge; and a plurality of hoods disposed and attached in succession by means of respective flexible mechanical joints, with each of said hoods there being associated with a respective plurality of adjustment means configured to move the respective hood independently from the others.

* * * * *